United States Patent [19]

Kurose

[11] 4,345,302

[45] Aug. 17, 1982

[54] LOW NOISE ELECTROLYTIC CAPACITORS

[75] Inventor: Hideo Kurose, Zushi, Japan

[73] Assignee: Momoyo Kuwada, Tokyo, Japan

[21] Appl. No.: 213,045

[22] Filed: Dec. 4, 1980

Related U.S. Application Data

[63] Continuation of Ser. No. 1,283, Jan. 4, 1979.

[30] Foreign Application Priority Data

Dec. 16, 1978 [JP] Japan .................. 53/156194

[51] Int. Cl.³ .................. H01G 9/00; B01J 17/00
[52] U.S. Cl. .................. 361/433; 29/570
[58] Field of Search .................. 361/433; 29/570

[56]  References Cited

U.S. PATENT DOCUMENTS

| | | | |
|---|---|---|---|
| 1,950,352 | 3/1934 | Curtis | 361/433 |
| 1,986,779 | 1/1935 | Lilienfeld | 361/433 |
| 2,104,018 | 1/1938 | Brennan | 361/433 |
| 3,256,468 | 6/1966 | Jenny et al. | 361/433 |
| 3,509,426 | 4/1970 | Winn | 361/433 |
| 3,513,358 | 5/1970 | Netherwood | 361/433 |
| 3,638,077 | 1/1972 | Chesnot | 361/433 |
| 3,675,086 | 7/1972 | Wenzel | 361/433 |
| 3,675,087 | 7/1972 | Zykov et al. | 361/433 |
| 4,009,424 | 2/1977 | Itoh | 361/433 |

Primary Examiner—Andrew J. James
Attorney, Agent, or Firm—Frishauf, Holtz, Goodman & Woodward

[57]  ABSTRACT

A capacitor comprises an anode foil, a cathode foil, and an intermediate layer interposed between the foils, the capacitor being impregnated with an electrolyte. The surface of the anode foil confronting the intermediate layer is formed with an oxide film. An insulator is provided to maintain at least the anode foil out of contact with the intermediate layer. The intermediate layer comprises a low density capacitor paper impregnated with an electroconductive fine powder such that one surface of the paper contacts the cathode foil with a small potential difference.

6 Claims, 6 Drawing Figures

LOW NOISE ELECTROLYTIC CAPACITORS

This is a continuation of application Ser. No. 1,283 filed Jan. 4, 1979.

BACKGROUND OF THE INVENTION

This invention relates to an improvement in low noise electrolytic capacitors suitable for use in the signal transmission circuit and signal circuit of an audio apparatus, for example.

As is well known in the art, the prior art electrolytic capacitor for use in audio apparatus or the like comprises an anode foil with one surface etched to become coarse and is provided with an oxide film, a spacer comprising low density capacitor paper and a cathode foil which are laminated and then wound into a roll. The capacitor paper acts as an insulator to insulate the anode foil and the cathode foil from each other and is impregnated with an electrolyte.

When such electrolytic capacitor is used in an audio device, for example, the oxide film of the anode foil acts as a dielectric to provide a large electrostatic capacitance, whereas the electrolyte cooperates with the cathode foil to act as a type of an electrode conductor. Accordingly, the electrolyte and the spacer which are interposed between the anode foil and the cathode foil form a portion of the current path for an audio signal or the like to impart various influences upon the signal passing therethrough. More particularly, the resistance component of the electrolyte is directly related to the impedance characteristic and the tan δ characteristic of the capacitor. Theoretically, it is desirable to use an electrolyte having a high electroconductivity but such electrolyte has a tendency of corroding the electrode film made of aluminum for example. For this reason, an electrolyte consisting of a solution of ammonium borate having a conductivity of about several hundred ohms/cm is used practically. The electric charge migrates through such electrolyte so that, when an alternating current signal is passed, the electrolyte presents the following problem.

More particularly, the spacer containing the electrolyte and interposed between the oxide film formed on the surface of the anode electrode and the cathode electrode manifests said resistance component and the resistance of the spacer varies nonlinearly depending upon the distance between the electrode surfaces and the applied voltage. Thus, the potential distribution does not always vary linearly as in a conventional resistor. Accordingly, the spacer has a nonlinear influence upon the movement current inside the capacitor with the result that many higher harmonic components are induced in the signal. Of course, the nonlinear characteristic formed between the oxide film and the electrolyte can not be ignored, and the nonlinearlity is enhanced by the aforementioned characteristic of the electrolyte.

SUMMARY OF THE INVENTION

It is an object of this invention to provide an improved low noise electrolytic capacitor capable of eliminating the problems described above.

Briefly stated according to this invention, an electroconductive intermediate layer containing electroconductive fine particles distributed therein is interposed between a pair of electrode foils, such as anode and cathode foils, so as to maintain the intermediate layer at an intermediate potential with respect to both electrodes so as to improve the nonlinearlity of the electrolyte and to greatly decrease the higher harmonic components generated in the audio signal, for example, passing through the capacitor, thereby providing a low noise electrolytic capacitor suitable for use in a high fidelity amplifier or the like.

As the spacer generally called capacitor paper, have been used Kraft paper, Manila paper or the like. Since ionizable components or conductive fine particles of iron, etc. remaining in these papers greatly affect the quality of the electrolytic capacitor, it has been necessary to remove as far as possible these impurities.

As a result of my research I have found the following facts. The electroconductive fine particles do not affect the performance of the electrolytic capacitor to any appreciable extent. However, when the electroconductive fine particles deposit near the anode surface, an abnormal potential is applied to a barrier film consisting of a semiconductive oxide film formed on the surface of the anode electrode and extending toward the electrolyte whereby the potential gradient near the barrier is extremely increased to rupture the insulating oxide film. On the other hand, the electroconductive fine particles which are suitably maintained out of contact with the anode electrode do not affect the performance of the electrolytic capacitor but rather contribute to the great reduction in the noise components caused by the inherent non-linear characteristic of the electrolyte.

DESCRIPTION OF THE PREFERRED EMBODIMENTS

Figure 1:
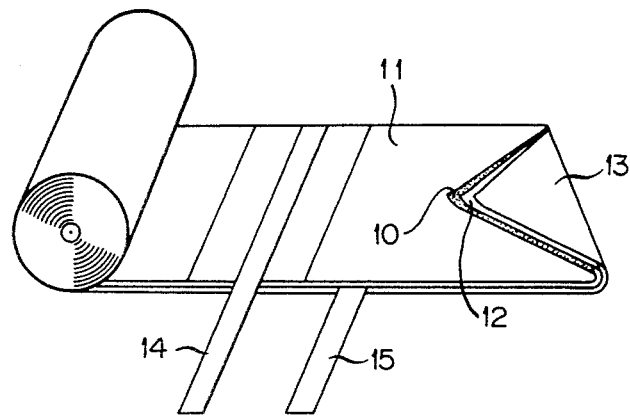
FIG. 1 is a partially developed view of an electrolytic capacitor embodying the invention.

A preferred embodiment of this invention will now be described with reference to the accompanying drawings. In the electrolytic capacitor shown in FIG. 1, an oxide film 10 is formed on the inner surface of an anode foil 11 made of aluminum or the like. On the surface of the oxide film 10 on the anode foil 11 is superposed an intermediate layer 12 comprising a low density capacitor paper and acting as a spacer, and a metallic cathode foil 13 is laminated on the intermediate layer. Lead wires 14 and 15 are secured by welding to the anode foil 11 and the cathode foil 13. The laminated anode and cathode foils 11, 13 and intermediate layer 12 are wound into a roll and the roll is impregnated with an electrolyte to complete the electrolytic capacitor.

The intermediate layer 12 interposed between the anode foil 11 and the cathode foil 13 contains electroconductive fine particles distributed therein. Usually the capacitor paper acting as the spacer has a thickness of about 30 to 60 microns and the electroconductive fine particles are distributed therein. The electroconductive fine particles are distributed such that they will be exposed on the surface of the oxide film 10 on the anode foil 11.

Figure 2:
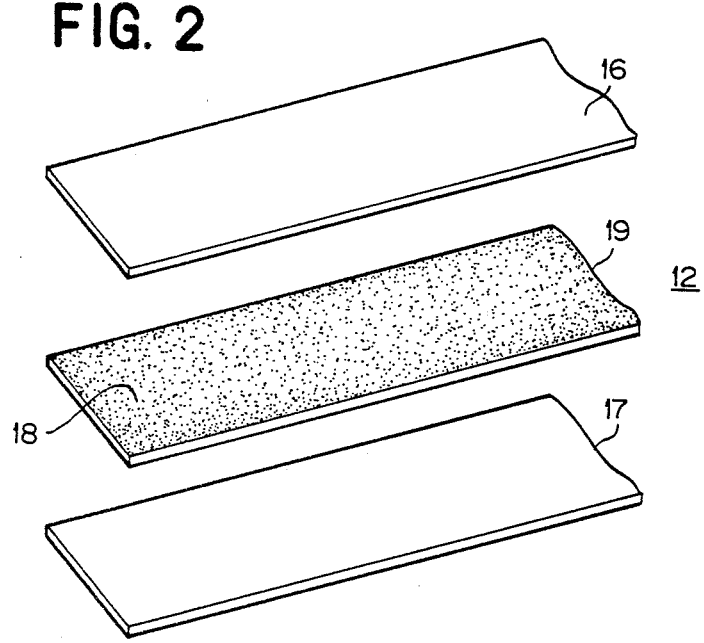
FIG. 2 is a developed view showing the intermediate layer utilized in the capacitor shown in FIG. 1.

FIG. 2 shows one example of the construction of the intermediate layer 12. As shown, an electroconductive paper 19 containing electroconductive fine powder 18 such as, for example, graphite powder and carbon powder, (graphite powder being preferred), is interposed between sheets of paper 16 and 17, and these sheets are bonded together in a paper manufacturing machine. In this manner, the intermediate layer 12 is provided with highly insulative surfaces which face the oxide film 10 on the anode foil 11 and the cathode foil 13 and its center layer 19 is highly conductive.

The intermediate layer 12 is interposed between the anode foil 11 and the cathode foil 13 and the lamination is wound into a roll. Thereafter an electrolyte is impregnated into the sheets of paper 16 and 17 of the intermediate layer to complete an electrolytic capacitor. The capacitor is suitably aged and degassed.

It is essential to hold the electroconductive sheet of paper 19 out of contact with the oxide film 10 of the anode foil 11. When the content of the electroconductive fine particles 18 is small and when the contact resistance between the electroconductive sheet of paper 19 and the cathode foil 13 is small thereby creating a small voltage drop, the paper 17 may be omitted to permit direct contact between the electroconductive paper 19 and the cathode foil 13. Actually, however, it is advantageous to separate the cathode foil 13 and the electroconductive paper 19 by a distance larger than a predetermined value to establish a large potential difference therebetween. For this reason an intermediate layer 12 having insulator paper 17 on the surface thereof facing the cathode foil 13 is preferred.

TABLE 1

| Sample No | graphite concentration (%) before and after paper making | |
|---|---|---|
| | before paper making | after paper making |
| 1 | 20 | 5.8 |
| 2 | 40 | 9.7 |
| 3 | 60 | 14.2 |
| 4 | 80 | 17.8 |
| 5 | 100 | 23.1 |

Table 1 shows some examples of the graphite concentration before and after paper making when a capacitor paper was prepared by adding granular graphite having a grain size of approximately 1 micron to Manila hemp pulp. As shown, the graphite concentration increases from sample No. 1 toward sample No. 5. Sample No. 6 (FIG. 3) not shown in this table does not contain any graphite particles.

Figure 3:
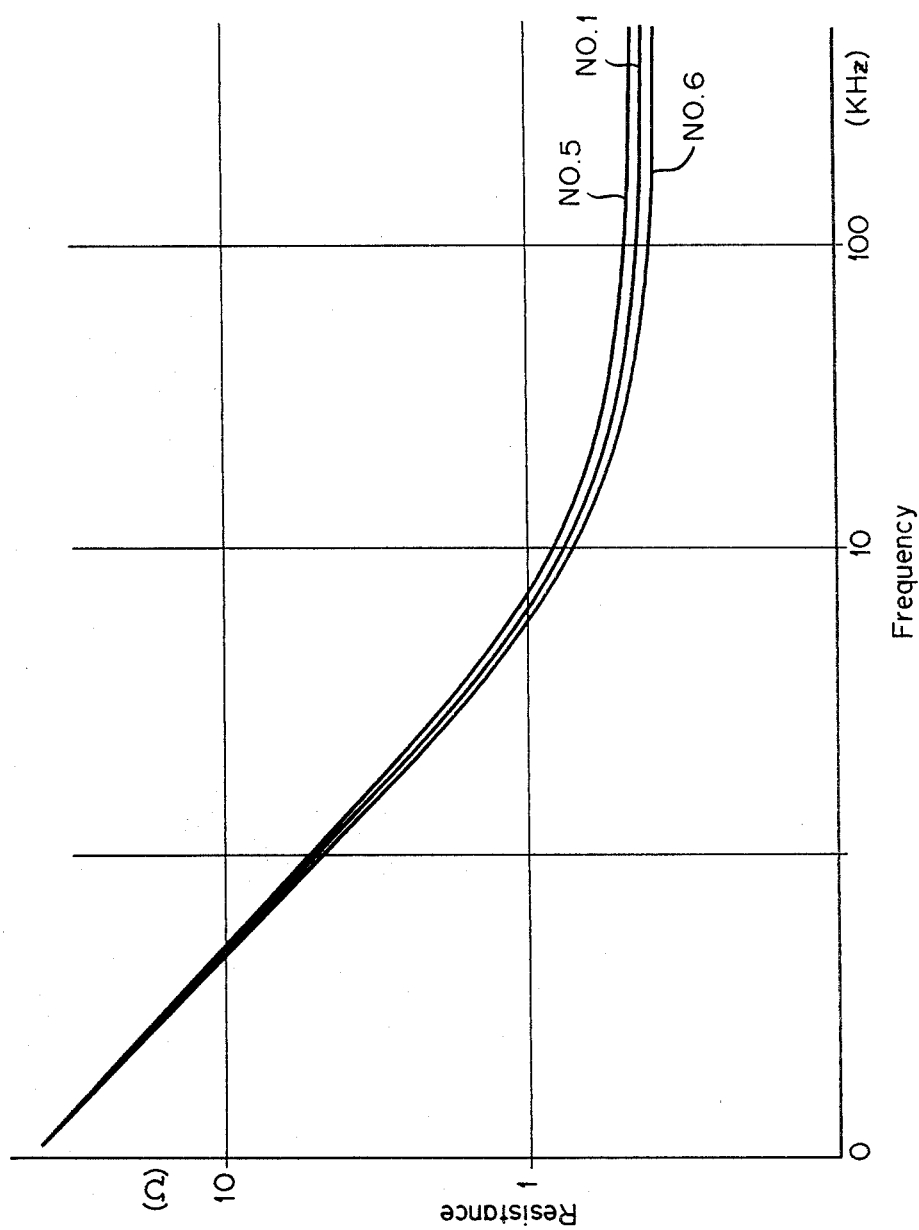
FIG. 3 is a graph showing curves which compare the relationship between the frequency and the impedance of the prior art capacitor and the electrolytic capacitor according to this invention.

FIG. 3 shows the impedance characteristics of 50V, 33μF electrolytic capacitors utilizing the intermediate layers 12 which were obtained by laminating conductive papers in which graphite powder has been distributed as shown in Table 1 and ordinary paper sheets as shown in FIG. 2. In FIG. 3, sample No. 6 utilizes an intermediate layer made up of ordinary paper not containing graphite, while sample Nos. 1 and 5 utilize the papers of sample Nos. 1 and 5 shown in Table 1. As can be noted from FIG. 3, sample Nos. 1–5 have substantially the same impedance characteristic as sample No. 6. Considering the other characteristics, as the content of graphite increases, that is, as the conductivity increases, leakage current and loss tend to increase only slightly.

Figure 4:
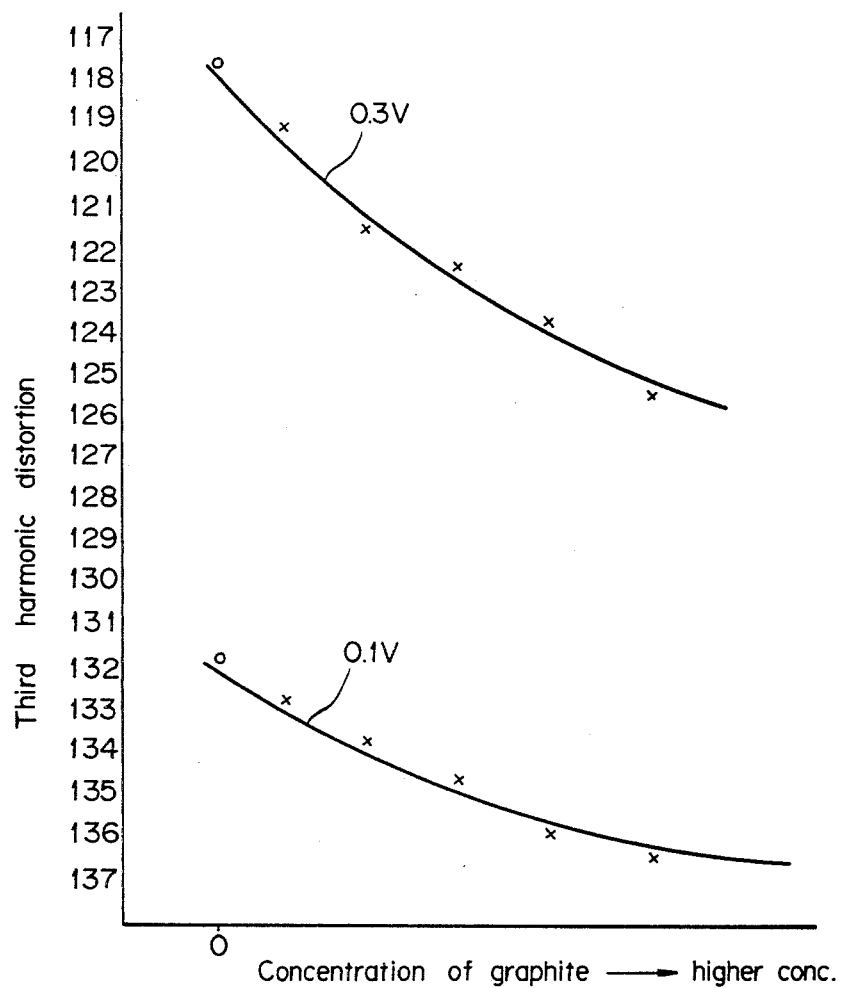
FIG. 4 is a graph which compares the generation of the third harmonic distortion in an audio signal.

The noise characteristic of the electrolytic capacitor was investigated by passing an audio signal in an audio frequency band as in an audio circuit. FIG. 4 shows the relationship between the graphite concentration and the distribution of the third harmonics. As shown, as the concentration of the graphite contained in the conductive paper 19 constituting the intermediate layer 12 increases, the amount of the third harmonics caused by cross modulation distortion decreases greatly. It should be particularly noted that the noise decrease characteristic is much steeper in a high load characteristic (0.3 v) than in a light load characteristic. This tendency is just opposite to the characteristic of the prior art electrolytic capacitors in which the noise increases rapidly with an increase in the load.

Thus, an electrolytic capacitor including an intermediate layer has decreased noise under high load meaning that such capacitor is extremely suitable for use in amplifier circuits of audio devices, for example. In other words, where such amplifier circuits utilize the electrolytic capacitor of this invention, it is possible to decrease the noise level by several to 10 db compared to those utilizing conventional electrolytic capacitors. For this reason, it is possible to greatly decrease the internal noise of the audio device as well the cross modulation distortion of the audio signal, thereby reproducing the audio signal at high fidelities.

As can be noted from the foregoing description the electrolytic capacitor of this invention provided with an electroconductive intermediate layer 12 can not only greatly decrease the noise at a high frequency band of audio signals, for example, but also improves the ion mobility characteristic between the electrodes.

As is well known in the art, the ion mobility characteristic inside of an electrolytic capacitor degrades with a decrease in the operating frequency so that the electrolytic capacitor can not operate satisfactorily at low frequency regions. For this reason, when used in an audio circuit, the electrolytic capacitor decreases the transmission characteristic of audio signals in low frequency bands.

Figure 5:
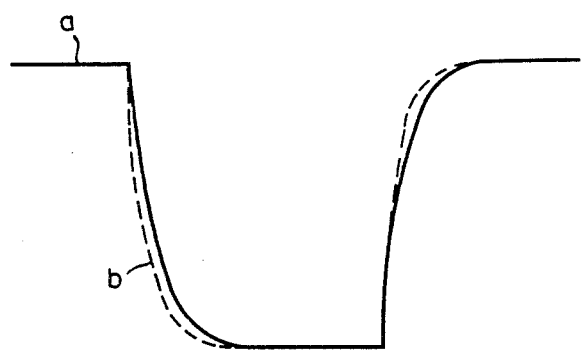
FIG. 5 shows a rectangular waveform which compares the transmission characteristics of a rectangular wave.

FIG. 5 shows the result of oscilloscope observation of the outputs of a prior art 50V, 33μF electrolytic capacitor not provided with an intermediate layer and of an electrolytic capacitor of this invention utilizing an electroconductive intermediate layer when a one volt rectangular wave having a period of 20 Hz was applied. In FIG. 5 solid line a shows the output waveform of the prior art electrolytic capacitor, whereas dashed line b shows that of the electrolytic capacitor of this invention. As can be noted from this result of observation, the solid line a shows that the inclinations of the fall up and build down of the rectangular wave are not so steep whereas dashed line b shows that the inclinations of the fall up and build down are improved, showing that the transmission characteristic of low frequency signals can be improved by the capacitor of this invention.

Since the mobility of ions between the electrodes of an electrolytic capacitor decreases with the operating frequency, the noise characteristic of the electrolytic capacitor in high frequency bands is not relatively affected by the magnitude of the load.

In the foregoing embodiment, high purity papers and a conductive paper were laminated as shown in FIG. 2 for the purpose of maintaining at least one surface of the conductive paper out of contact with the anode foil.

Figure 6:
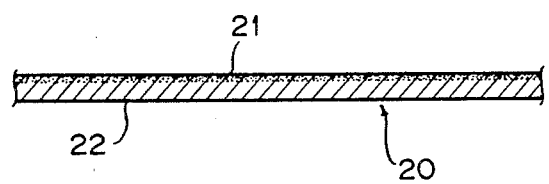
FIG. 6 is a sectional view showing another example of the intermediate layer.

However, the intermediate layer 12 that can accomplish the object of this invention can also be prepared by coating and impregnating liquid containing graphite onto one surface 21 of a capacitor paper 20 as shown in FIG. 6. In this case, care should be taken not to permit the graphite containing liquid to reach the opposite surface 22 of the capacitor paper 20.

Since the electroconductive layer of the intermediate layer may contact directly with the cathode foil 13 so as to create a small potential difference therebetween when the surface of the cathode foil 13 which faces the intermediate layer 12 is subjected to a formation processing under a low voltage of less than 10 V, it is possible to establish a small potential difference between the cathode electrode and the intermediate layer even when the conductive surface of the intermediate layer 12 has a low impedance, thereby decreasing the internal noise of audio signals of audio devices due to cross modulation distortion.

While the above description has been given with reference to electrolytic capacitors for use with direct current, the same advantageous effects can also be obtained with bi-polar type electrolytic capacitors for use with alternating current.

In the bi-polar electrolytic capacitor both electrode foils 11 and 13 shown in FIG. 1 act as anode electrodes and their surfaces confronting the intermediate layer 12 are provided with oxide films. In this case the intermediate layer 12 should have an insulator layer on the opposite sides as shown in FIG. 2 so as to maintain the conductive paper layer 12 at a potential intermediate the potentials of both foil electrodes.

What is claimed is:

1. A low noise electrolytic capacitor comprising:
   a pair of electrodes consisting of an anode foil and a cathode foil; and
   an intermediate electroconductive layer interposed between said pair of electrodes;
   said intermediate electroconductive layer composed of a first paper sheet contacted with said anode foil and impregnated with an electrolyte and a second paper sheet contacted with said cathode foil and impregnated with the electrolyte;
   said second paper further containing an electroconductive fine powder distributed therein in an amount of less than 10% by weight based on the weight of said intermediate electroconductive layer; and
   said fine powder being about one micron in grain size.

2. A low noise electrolytic capacitor according to claim 1, wherein said intermediate layer further includes a third paper sheet between the second paper sheet and the cathode foil, said third paper sheet also being impregnated with the electrolyte.

3. A low noise electrolytic capacitor according to claim 1, wherein said intermediate layer comprises a paper sheet containing an electroconductive fine powder in only the anode foil side surface of said sheet.

4. A low noise electrolytic capacitor according to claim 1 or 2 or 3, wherein the surface of said anode foil facing said intermediate layer is formed with an oxide film.

5. A low noise electrolytic capacitor according to claim 4, wherein said electroconductive fine powder is in an amount between 5.8 and 9.7%.

6. A low noise electrolytic capacitor according to claim 5, wherein said electroconductive fine powder is graphite.

* * * * *

UNITED STATES PATENT AND TRADEMARK OFFICE
CERTIFICATE OF CORRECTION

PATENT NO. : 4,345,302
DATED : August 17, 1982
INVENTOR(S) : Hideo KUROSE

It is certified that error appears in the above-identified patent and that said Letters Patent is hereby corrected as shown below:

Column 1, line 52, the words "movement current" should read

--movement of the current--;

Column 3, lines 1 and 2, the words "will be exposed" should read

--will not be exposed--;

Column 4, lines 50, 51, 54 and 56, the reference letters (i.e., solid line a, dashed line b) should be underlined;

Signed and Sealed this

Third Day of May 1983

[SEAL]

Attest:

GERALD J. MOSSINGHOFF

Attesting Officer   Commissioner of Patents and Trademarks

UNITED STATES PATENT AND TRADEMARK OFFICE
CERTIFICATE OF CORRECTION

PATENT NO. : 4,345,302
DATED : August 17, 1982
INVENTOR(S) : Hideo KUROSE

It is certified that error appears in the above-identified patent and that said Letters Patent is hereby corrected as shown below:

Column 4, lines 54 and 55, the words "fall up and build down" should read --build up and fall down--;

Column 4, line 57, the words "fall up and build down" should read --build up and fall down--.

Signed and Sealed this

Fifth Day of July 1983

[SEAL]

Attest:

GERALD J. MOSSINGHOFF

Attesting Officer — Commissioner of Patents and Trademarks